United States Patent
Cheng et al.

(10) Patent No.: US 7,391,006 B2
(45) Date of Patent: Jun. 24, 2008

(54) FINGERPRINT SCANNING DEVICE WITH CONTACT IMAGE SENSING MODULE

(75) Inventors: Chia-Chu Cheng, Taipei (TW); Wen-Chen Yang, Taipei (TW); Ming-Ho Wang, Taipei (TW)

(73) Assignee: Lite-On Semiconductor Corp., Taipei (TW)

( * ) Notice: Subject to any disclaimer, the term of this patent is extended or adjusted under 35 U.S.C. 154(b) by 309 days.

(21) Appl. No.: 11/242,809

(22) Filed: Oct. 5, 2005

(65) Prior Publication Data

US 2006/0140458 A1 Jun. 29, 2006

(30) Foreign Application Priority Data

Dec. 28, 2004 (TW) .............................. 93221062 U

(51) Int. Cl.
*H01L 27/00* (2006.01)
*G06K 9/00* (2006.01)

(52) U.S. Cl. ................. 250/221; 250/208.1; 356/71; 382/124

(58) Field of Classification Search .............. 250/208.1, 250/221; 382/124–127; 356/71
See application file for complete search history.

(56) References Cited

U.S. PATENT DOCUMENTS

| | | | |
|---|---|---|---|
| 5,621,516 A * | 4/1997 | Shinzaki et al. | 356/71 |
| 6,011,860 A * | 1/2000 | Fujieda et al. | 382/126 |
| 6,088,585 A | 7/2000 | Schmitt et al. | |
| 6,259,108 B1 * | 7/2001 | Antonelli et al. | 250/556 |
| 6,324,310 B1 | 11/2001 | Brownlee | |
| 6,355,937 B2 * | 3/2002 | Antonelli et al. | 250/556 |
| 6,627,871 B2 * | 9/2003 | Iwamoto et al. | 250/221 |
| 6,628,813 B2 * | 9/2003 | Scott et al. | 382/124 |
| 7,054,471 B2 * | 5/2006 | Tschudi | 382/124 |
| 7,103,201 B2 * | 9/2006 | Scott et al. | 382/124 |
| 7,110,577 B1 * | 9/2006 | Tschudi | 382/124 |
| 2004/0208346 A1 * | 10/2004 | Baharav et al. | 382/124 |
| 2004/0208347 A1 * | 10/2004 | Baharav et al. | 382/124 |
| 2004/0208348 A1 * | 10/2004 | Baharav et al. | 382/124 |

FOREIGN PATENT DOCUMENTS

TW 544630 8/2003

* cited by examiner

*Primary Examiner*—Davienne Monbleau
(74) *Attorney, Agent, or Firm*—Rosenberg, Klein & Lee

(57) ABSTRACT

A fingerprint scanning device and an electronic device with a fingerprint scanning function are proposed. The fingerprint scanning device has a contact image sensing module, a signal conversion controller, a module controller and an interface controller. The contact image sensing module captures a fingerprint image. The signal conversion controller converts this analog fingerprint image to a digital signal. The module controller controls the contact image sensing module and the signal conversion module. The interface controller transmits the digital signal to a controller in an electronic device. The contact image sensing module is used to lower the cost and lengthen the lifetime of use of the fingerprint scanning device, and to make the captured fingerprint image clearer. The interface controller is connected to the signal conversion module and the module controller to make the digital signal transmitted by the signal conversion controller more easily accessible.

21 Claims, 11 Drawing Sheets

FINGERPRINT SCANNING DEVICE WITH CONTACT IMAGE SENSING MODULE

BACKGROUND OF THE INVENTION

1. Field of the Invention

The present invention relates to a fingerprint scanning device and an electronic device with a fingerprint scanning function and, more particularly, to a fingerprint scanning device combining a highly-compatible data transmission/control interface and a unit of electronic device with a fingerprint scanning function.

2. Description of Related Art

A personal fingerprint is a unique bio-feature different from those of others. When used as a personal secret code, it is extremely secure. Because of the popularity of electronic device and the increase of their storage capacities, the protection for personal data stored therein becomes increasingly important. Using a fingerprint for unlocking electronic device or as a secret code can make management of personal data more efficient.

Electronic device such as a mobile phone, a computer host, and various kinds of computer peripherals can make use of a fingerprint scanning device to capture a user's fingerprint for identity confirmation. After the fingerprint image in the fingerprint scanning device is converted into digital fingerprint information, it is easy to transmit the digital fingerprint information to a controller in the electronic device to exploit fully the effect of fingerprint identification.

The fingerprint scanning device has an image sensing module. The image sensing module can be of a planar or linear shape for capturing an image. The image detection way of the image sensing module can be of capacitance type, temperature type, or electromagnetic type. In the disclosure of U.S. Pat. No. 6,088,585, "Portable telecommunication device including a fingerprint sensor and related methods" issued on Jul. 11, 2000, an array of electric field sensing electrodes is provided. In order to avoid electrostatic interference, an electrostatic protection device must be added to the telecommunication device, hence increasing the cost. Moreover, damage may easily arise due to the generation of static electricity during the production process. Besides, the finger touching the array of electric field sensing electrodes may cause damage. On the other hand, because the time for a finger to stay on the image sensing module is too long, a temperature type image sensing module cannot capture a clear fingerprint image.

In order to capture a planar fingerprint image, a linear type image sensing module needs to be able to sense the speed of the finger moving thereon to acquire segments of fingerprint image, which are further processed to form a complete fingerprint image.

A prior art image sensing module with a motion sensing function such as that disclosed in Taiwan Pat. No. TW544630, "Method and device of using a linear sensor to scan a fingerprint", comprises a linear image device, a roller, a light source, a focusing device and a rotation sensor. A fingerprint moves on the roller. Light of the light source is transmitted to the roller and reflected by the fingerprint to the focusing device, and is focused by the focusing device onto the linear image device. The rotation sensor is used to detect the rotating speed of the roller to acquire the speed of the fingerprint.

In the above prior art image sensing module with a speed detection function, the roller and the rotation sensor are used to determine the speed of the fingerprint, hence resulting in a bulky and complex image sensing module, which is not suitable for installation in miniaturized electronic device.

Moreover, there must be no deviation of the location of the focusing device, so that light can be accurately transmitted to the linear image device. The allowable tolerance is small, thus requiring precision to be too high in the assembly process, hence reducing the product yield.

Besides, the brightness of the light of the light source transmitted to the roller is not uniform enough, thus complicating processing of the fingerprint captured by the prior art image sensing module.

Furthermore, if the number of light sources is increased and these light sources are alternatingly arranged below the roller, the problem of irregular light brightness still exists, and the cost and consumed power of the image sensing module also increase.

SUMMARY OF THE INVENTION

An object of the present invention is to provide a fingerprint scanning device and an electronic device with a fingerprint scanning function to lower the cost and lengthen the lifetime of use of the fingerprint scanning device, to make the captured fingerprint image clearer, and to make the digital fingerprint information thereof more easily accessible.

Another object of the present invention is to provide a fingerprint scanning device and an electronic device with a fingerprint scanning function, in which the sensor architecture of an image sensing module of the fingerprint scanning device can detect the speed of a fingerprint relative to the sensors to reduce the size of the image sensing module, hence reducing the space occupied by the image sensing module when installed in the electronic device.

Another object of the present invention is to provide a fingerprint scanning device and an electronic device with a fingerprint scanning function, in which the allowable tolerance of the optical path formed by light of a light source of an image sensing module of the fingerprint scanning device transmitted to the sensors is larger, hence enhancing the product yield.

Another object of the present invention is to provide a fingerprint scanning device and an electronic device with a fingerprint scanning function, in which light of a light source of an image sensing module of the fingerprint scanning device transmitted to a fingerprint is more uniform, hence enhancing the processing efficiency of the image sensing module to the captured fingerprint image by the image sensing module.

Another object of the present invention is to provide a fingerprint scanning device and an electronic device with a fingerprint scanning function, in which the required number and consumed power of light sources of an image sensing module of the fingerprint scanning device are reduced, hence lowering the cost and lengthening the lifetime of use.

To achieve the above objects, the present invention provides a fingerprint scanning device, which comprises a contact image sensing module, a signal conversion controller, a module controller and an interface controller. The contact image sensing module captures a fingerprint image. The signal conversion controller is electrically connected to the contact image sensing module and used to convert the analog fingerprint image to a digital signal. The module controller is electrically connected to the contact image sensing module and the signal conversion controller and used to control the contact image sensing module and the signal conversion controller. The interface controller is electrically connected to the signal conversion controller and the module controller and used to control the transmission of the digital signal to a controller in an electronic device.

The contact image sensing module reduces the cost and lengthens the lifetime of use of the fingerprint scanning device, and makes the captured fingerprint image clearer.

The interface controller is connected to the signal conversion module and the module controller to make the digital signal transmitted by the signal conversion controller more easily accessible.

In a preferred embodiment, the contact image sensing module comprises a main circuit board, a linear sensor array, at least a motion sensor, a light source, and a detection surface. The linear sensor array is disposed on the main circuit board. The motion sensor is disposed on the main circuit board and parallel-arranged at one side of the linear sensor array. The detection surface is defined at one side of the linear sensor array and the motion sensor. A fingerprint is placed on the detection surface. Light of the light source is transmitted to the detection surface and then reflected by the fingerprint to the linear sensor array and the motion sensor.

In a preferred embodiment, the linear sensor array has a plurality of image sensors. At least one of the image sensors corresponds to the motion sensor, and is defined as a comparison sensor.

A reference image data and a comparison image data are picked from the fingerprint by the motion sensor and the comparison sensor of the linear sensor array, respectively. After processing a shift times discriminant and a speed discriminant, the speeds of the fingerprint relative to the motion sensor and the comparison sensor can be obtained, thereby reducing the size of the image sensing module of the present invention.

In a preferred embodiment of the present invention, the main circuit board is a composite circuit board, which comprises a first rigid printed circuit board, a second rigid printed circuit board, a third rigid printed circuit board and at least a flexible printed circuit board. The first, second and third rigid printed circuit boards are electrically connected to the flexible printed circuit board to form a first composite substrate, a second composite substrate and a third composite substrate, respectively. A predetermined upward tilt angle is formed on each of the second and third flexible substrates facing the first flexible substrate. The linear sensor array and the motion sensor are disposed on the second flexible substrate. The light source is disposed on said third flexible substrate.

In a preferred embodiment of the present invention, the main circuit board is a composite circuit board, which comprises a first rigid printed circuit board, a second rigid printed circuit board and a flexible printed circuit board. The first and second rigid printed circuit boards are electrically connected to the flexible printed circuit board to form a first composite substrate and a second composite substrate, respectively. A predetermined upward tilt angle is formed on the second flexible substrate facing the first flexible substrate. The linear sensor array and the motion sensor are disposed on the second flexible substrate. The light source is disposed on the first flexible substrate.

Through the structure of the composite circuit board, the linear sensor array shows a tilt angle to reduce the whole size and also increase the allowable tolerance of the optical path of the light source.

In a preferred embodiment, the contact image sensing module has a light guide device whose axis is parallel to the linear sensor array. One end of the light guide device is adjacent to the light source.

Through the structure of the light guide device, light of the light source transmitted to the fingerprint is more uniform, and the required number and consumed power of the light source are reduced.

To achieve the above objects, the present invention also provides an electronic device with a fingerprint scanning function, which comprises a fingerprint scanning device and a microprocessor. The fingerprint scanning device comprises a contact image sensing module, a signal conversion controller, a module controller and an interface controller. The contact image sensing module captures a fingerprint image. The signal conversion controller is electrically connected to the contact image sensing module and used to convert the analog fingerprint image to a digital signal. The module controller is electrically connected to the contact image sensing module and the signal conversion controller and used to control the contact image sensing module and the signal conversion controller. The interface controller is electrically connected to the signal conversion controller, the module controller and the microprocessor and used to control the transmission of the digital signal to the microprocessor.

To achieve the above objects, the present invention also provides an electronic device with a fingerprint scanning function, which comprises a fingerprint scanning device and a communication interface. The fingerprint scanning device comprises a contact image sensing module, a signal conversion controller, a module controller and an interface controller. The contact image sensing module captures a fingerprint image. The signal conversion controller is electrically connected to the contact image sensing module and used to convert the analog fingerprint image to a digital signal. The module controller is electrically connected to the contact image sensing module and the signal conversion controller and used to control the contact image sensing module and the signal conversion controller. The interface controller is electrically connected to the signal conversion controller, the module controller and the communication interface and used to control the transmission of the digital signal to the communication interface.

BRIEF DESCRIPTION OF THE DRAWINGS

The various objects and advantages of the present invention will be more readily understood from the following detailed description when read in conjunction with the appended drawing, in which.

DETAILED DESCRIPTION OF THE PREFERRED EMBODIMENTS

Figure 1:
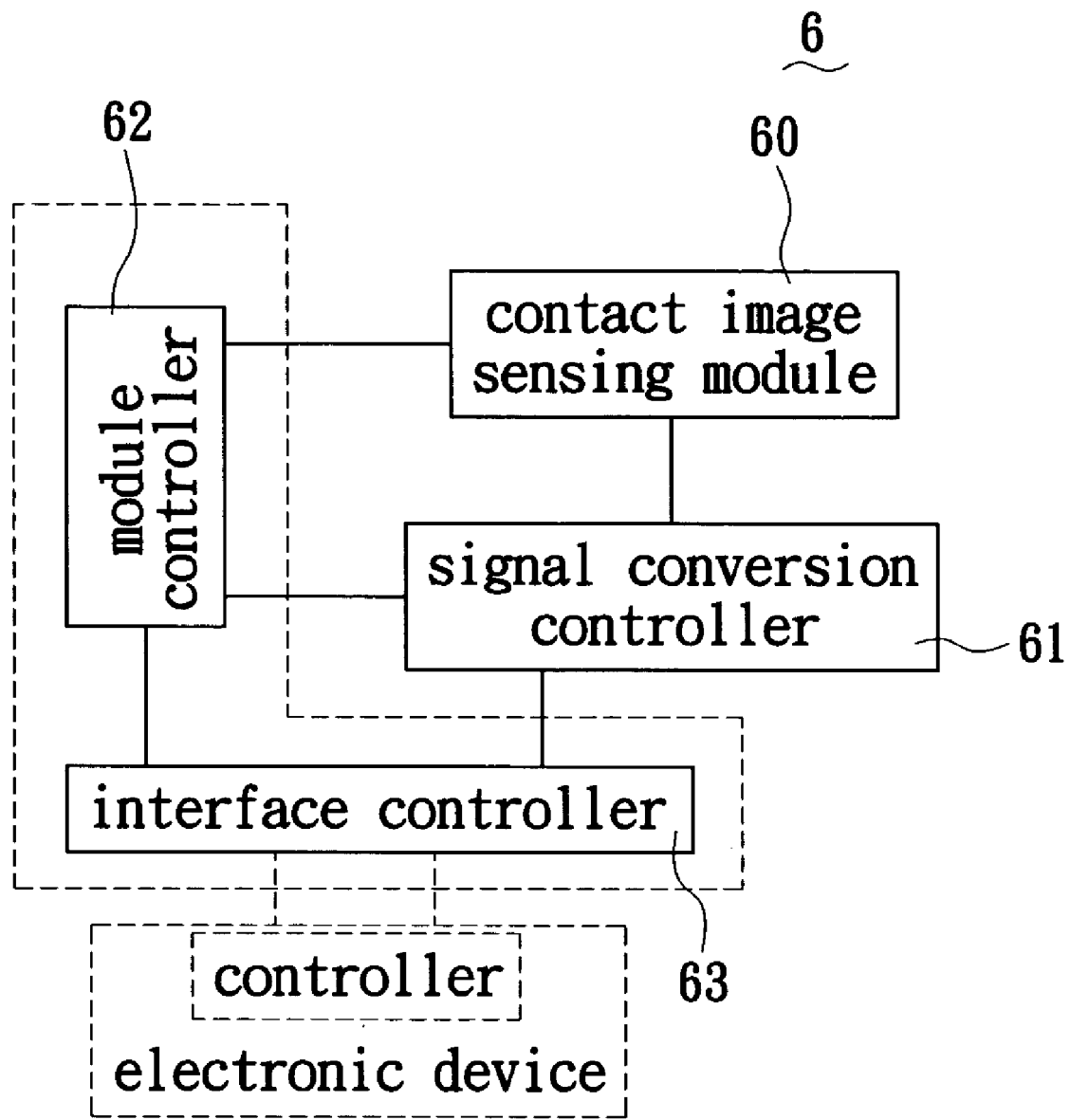
FIG. 1 is a block diagram of a fingerprint scanning device of the present invention.
Figure 2:
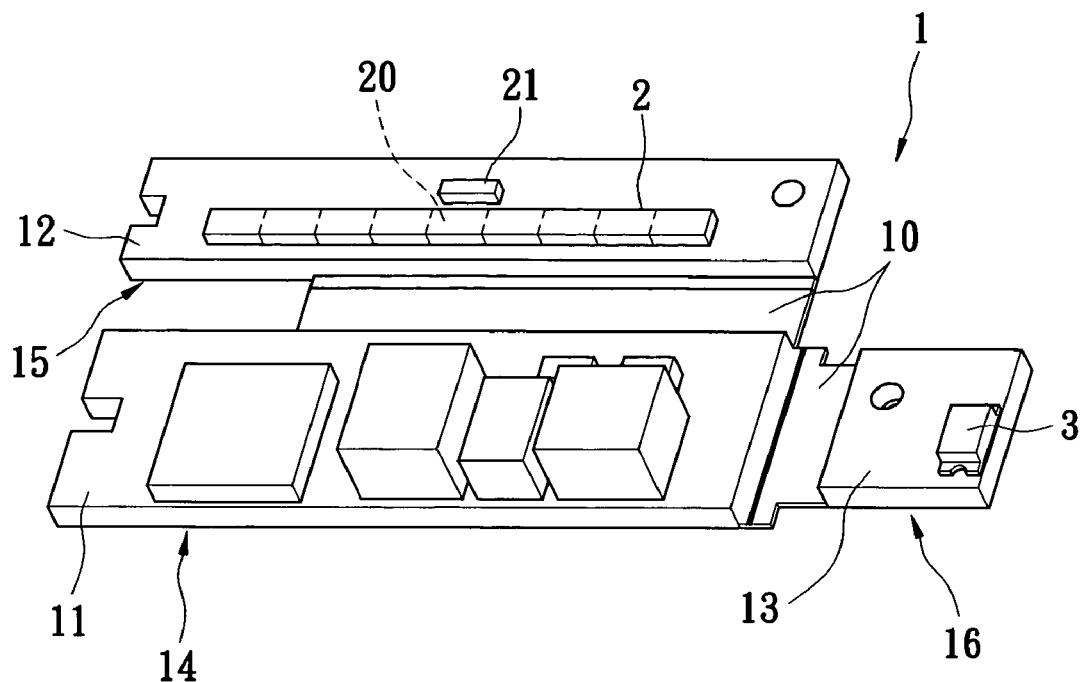
FIG. 2 is a perspective view of a composite circuit board, a linear sensor array, a motion sensor, and a light source according to a first embodiment of a contact image sensing module of a fingerprint scanning device of the present invention.
Figure 4:
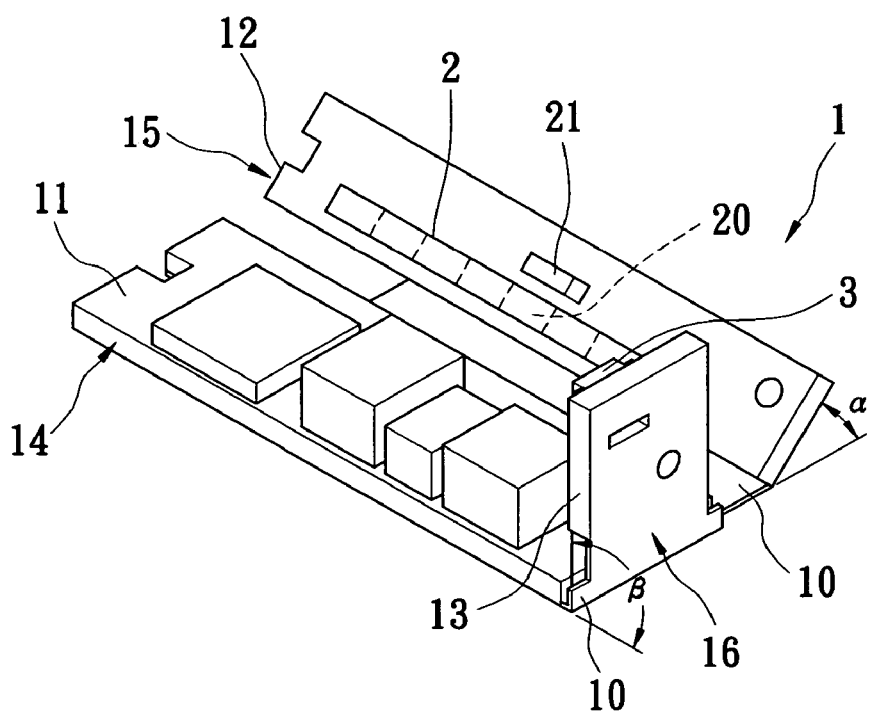
FIG. 4 another perspective view of a composite circuit board, a linear sensor array, a motion sensor, and a light source according to the first embodiment a contact image sensing module of a fingerprint scanning device of the present invention.

As shown in FIG. 1, a fingerprint scanning device 6 of the present invention comprises a contact image sensing module 60, a signal conversion controller 61, a module controller 62 and an interface controller 63.

The contact image sensing module 60 is used to capture a fingerprint image.

The signal conversion controller 61 is electrically connected to the contact image sensing module 60 and used to convert the analog fingerprint image to a digital signal.

The module controller 62 is electrically connected to the contact image sensing module 60 and the signal conversion controller 61 and used to control the contact image sensing module 60 and the signal conversion controller 61 (e.g., providing various control functions such as timing control).

The interface controller 63 is electrically connected to the signal conversion controller 61 and the module controller 62 and used to control the transmission of the digital signal to a control (not shown) in an electronic device (e.g., providing various control functions such as accomplishing the communication protocol between the fingerprint scanning device and the electronic device, temporal storage and buffer of the digital signal, formatting of the digital signal, and of the digital signal). The module controller 62 and the interface controller 63 can be two separate controllers, or can be integrated into a single controller.

Figure 12:
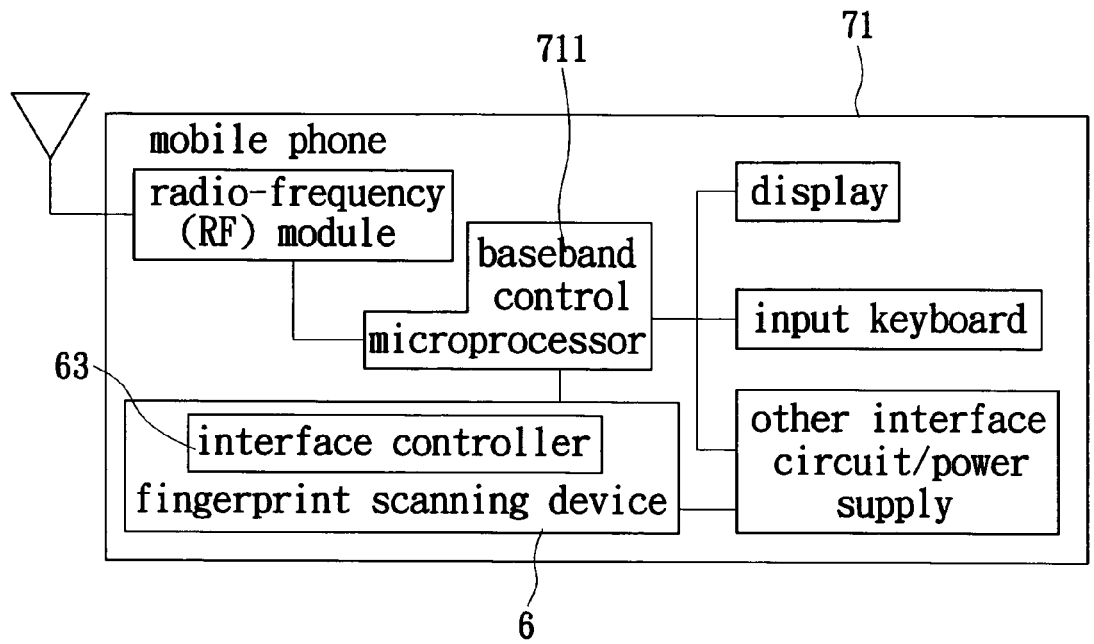
FIG. 12 is a block diagram according to a first embodiment of an electronic device with a fingerprint scanning function of the present invention.

As shown in FIGS. 1 and 12, the fingerprint scanning device 6 is built in an electronic device 71 (e.g., a mobile phone). The interface controller 63 is electrically connected to a controller (e.g., a baseband control microprocessor 711) in the electronic device 71. Reference is made to FIGS. 1 and 13 to 15. The interface controller 63 can further electrically connect a wireless communication interface 721 (e.g., a USB communication interface) to be electrically connected to an external electronic device 79 (e.g., a computer host). As shown in FIGS. 1 and 16, the interface controller 63 can further electrically connect a wireless communication interface 751 (e.g., a wireless transceiver) to perform wireless transmission with an external electronic device 79 (e.g., a computer host). The interface controller 63 makes the digital signal more easily accessible.

FIGS. 2 to 7 show a first embodiment of the contact image sensing module 60 of the fingerprint scanning device 6 of the present invention. The contact image sensing module 60 comprises a main circuit board 1, a linear sensor array 2, at least a motion sensor 21, a light source 3, a focusing device 4, a light guide device 5 and a detection surface A.

The main circuit board 1 is a composite circuit board, which comprises a first rigid printed circuit board 11, a second rigid printed circuit board 12, a third rigid printed circuit board 13 and at least a flexible printed circuit board 10. The first, second and third rigid printed circuit boards 11, 12 and 13 are electrically connected to the flexible printed circuit board 10 to form a first composite substrate 14, a second composite substrate 15 and a third composite substrate 16, respectively. The flexible printed circuit board 10 connecting the first and second composite substrates 14 and 15 can be the same as or different from that connecting the first and third composite substrate 14 and 16.

Figure 3:
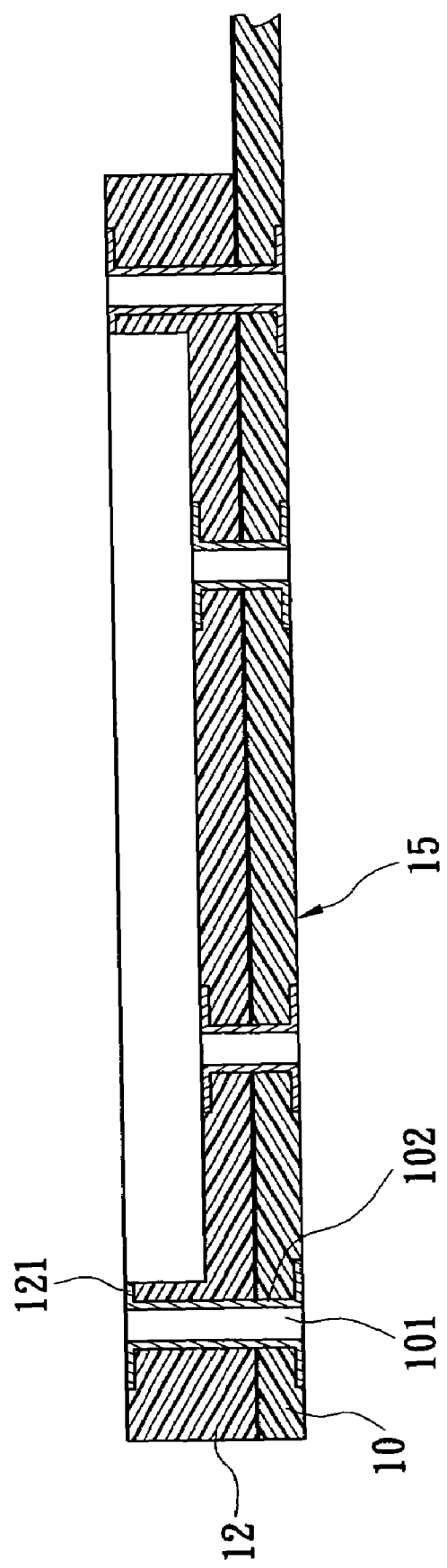
FIG. 3 is a local cross-sectional view of a composite circuit board according to the first embodiment of a contact image sensing module of a fingerprint scanning device the present invention.
Figure 5:
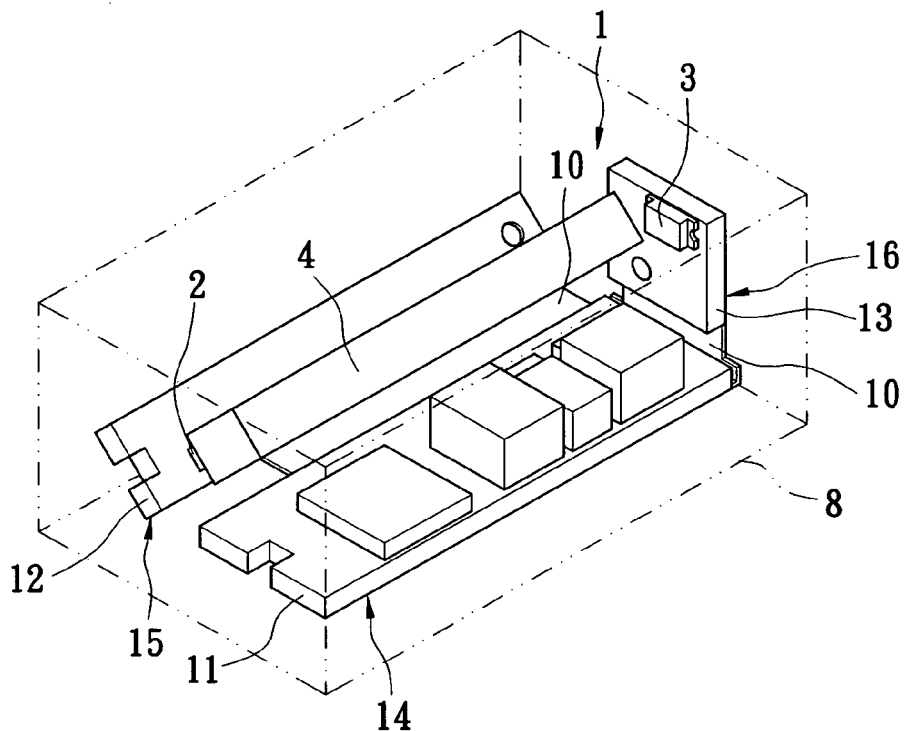
FIG. 5 is a perspective view of a composite circuit board, a linear sensor array, a motion sensor, a light source, and a focusing device according to the first embodiment a contact image sensing module of a fingerprint scanning device of the present invention.
Figure 6:
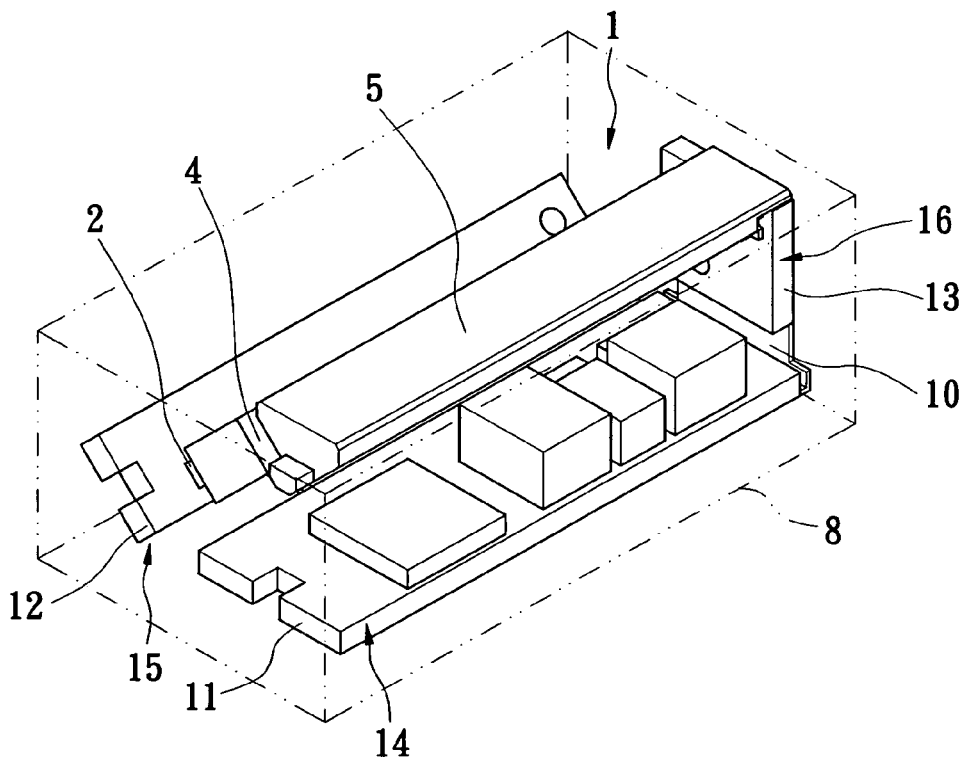
FIG. 6 is a perspective view of the first embodiment of a contact image sensing module of a fingerprint scanning device of the present invention.

Reference is made to FIG. 3. A plurality of through holes 101 and a plurality of conducting components 102 are disposed on the first composite substrate (not shown), the second composite substrate 15, and the third composite substrate (not shown). Each conducting component 102 is disposed on the inner surface of one corresponding through hole 101, and is electrically connected to the first rigid printed circuit board (not shown) and the flexible printed circuit board 10, the second rigid printed circuit board 12 and the flexible printed circuit board 10, and the third rigid printed circuit board (not shown) and the flexible printed circuit board 10. A plurality of solder pads 121 is disposed on the second rigid printed circuit board 12 of the second composite substrate 15. These solder pads 121 are electrically connected to locally corresponding conducting components 102, respectively.

Predetermined upward tilt angles α and β are formed on the second and third composite substrates 15 and 16 facing the first composite substrate 14, respectively. In this embodiment, the second composite substrate 15 tilts upwards 45 degrees relative to the first composite substrate 14, while the third composite substrate 16 tilts upwards 90 degrees relative to the first composite substrate 14. Of course, the upward tilt angles α and β can also be 30, 60, or 75 degrees.

The linear sensor array 2 segmentally captures a plurality of segments of fingerprint image. The linear sensor array 2 is disposed on the second composite substrate 15. The linear sensor array 2 has a plurality of contact image sensors (CIS). The linear sensor array 2 is electrically connected to the second rigid printed circuit board 12 of the second composite substrate 15 and the solder pads 121 by means of chip-on-board (COB). The linear sensor array 2 achieves electric connection with the first rigid printed circuit board 11 of the first composite substrate 14 through the composite printed circuit board 10.

The motion sensor 21 is disposed on the second composite substrate 15 of the main circuit board 1 and parallel-arranged at one side of the linear sensor array 2. The motion sensor 21 is a contact image sensor. The motion sensor 21 is electrically connected with the second rigid printed circuit board 12 by means of COB. The motion sensor 21 achieves electric connection with the first rigid printed circuit board 11 of the first composite substrate 14 through the flexible printed circuit board 10.

At least one of the contact image sensors corresponds to the motion sensor 21, and this contact image sensor is defined as a comparison sensor 20.

The light source 3 is an LED, and is disposed on the third composite substrate 16 of the main circuit board 1. The light source 3 is electrically connected with the third rigid printed circuit board 13 of the third composite substrate 16 by means of COB. The light source 3 achieves electric connection with the first rigid printed circuit board 11 of the first composite substrate 14 through the flexible printed circuit board 10. The light source 3 can also be disposed on another circuit board.

If the focusing device 4 is a lens, its axis is parallel to the linear sensor array 2.

If the light guide device 5 is a light-pervious rod, its axis is parallel to the linear sensor array 2. One end of the light guide device 5 is adjacent to the light source 3. The focusing device 4 is located between the light guide device 5 and the linear sensor array 2. A reflecting surface 50 and a light-emanating surface 51 are formed along the axis of the light guide device 5. The light-emanating surface 51 corresponds to the focusing device 4. The focusing device 4 and the light guide device 5 are supported on a machine body 8 of an electronic device. The focusing device 4 can also be integrally formed with, or assembled on, the light guide device 5.

Figure 7:
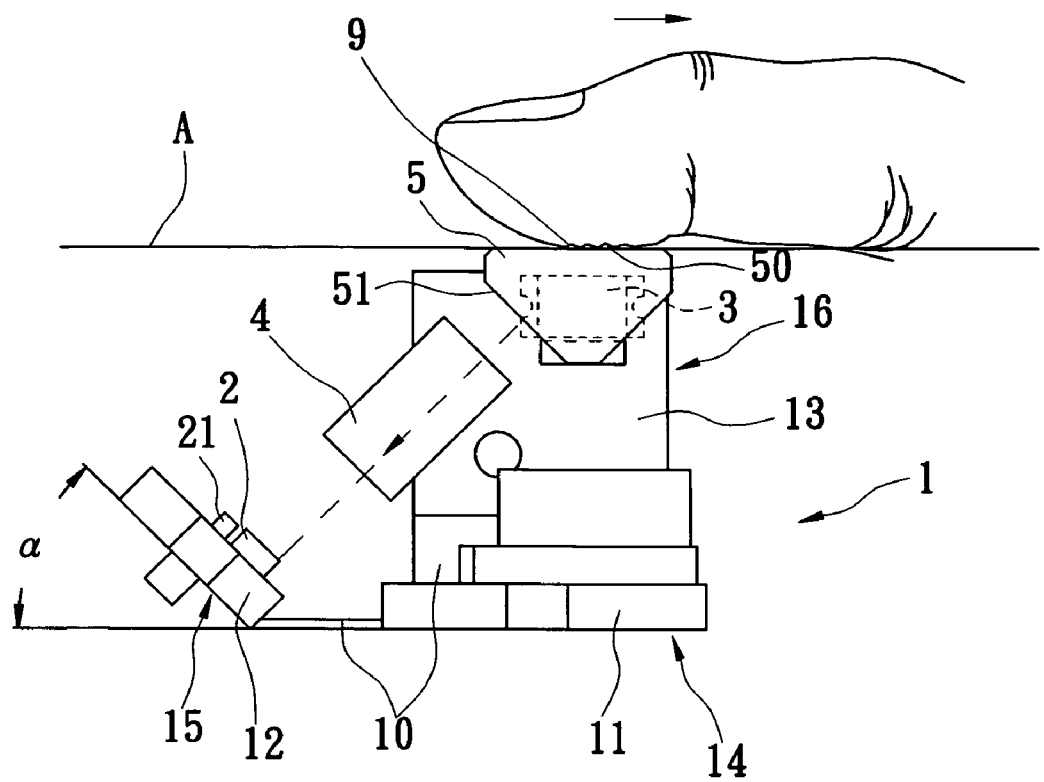
FIG. 7 is a cross-sectional view of the first embodiment of a contact image sensing module of a fingerprint scanning device of the present invention.
Figure 8:
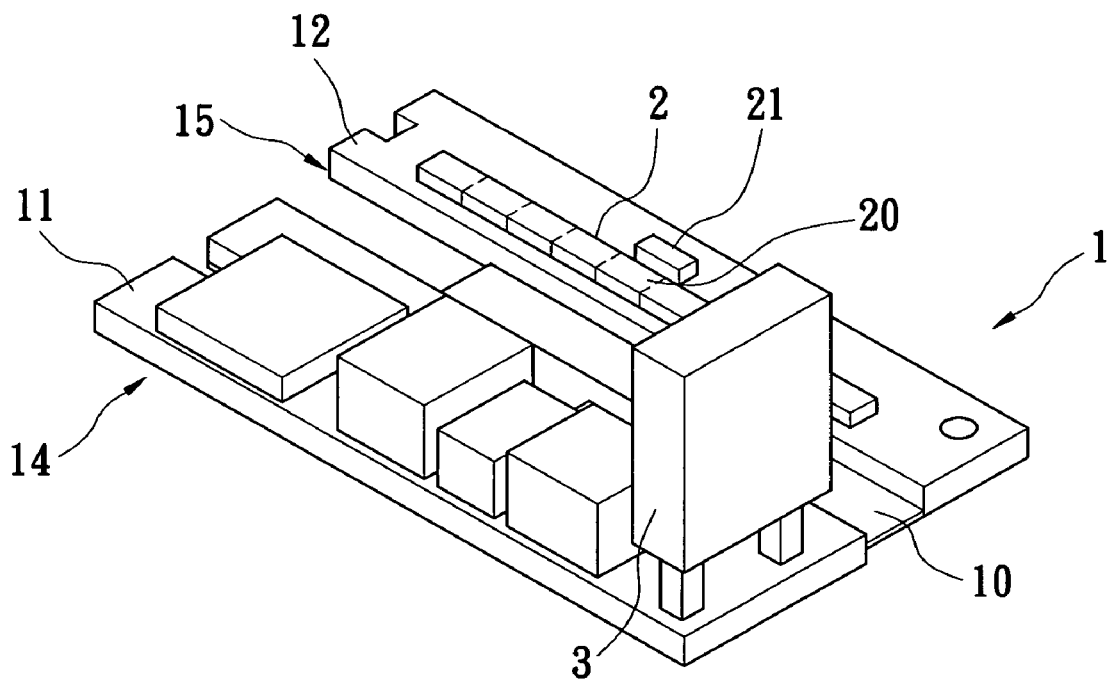
FIG. 8 is a perspective view of a composite circuit board, a linear sensor array, a motion sensor, and a light source according to a second embodiment of a contact image sensing module of a fingerprint scanning device of the present invention.
Figure 9:
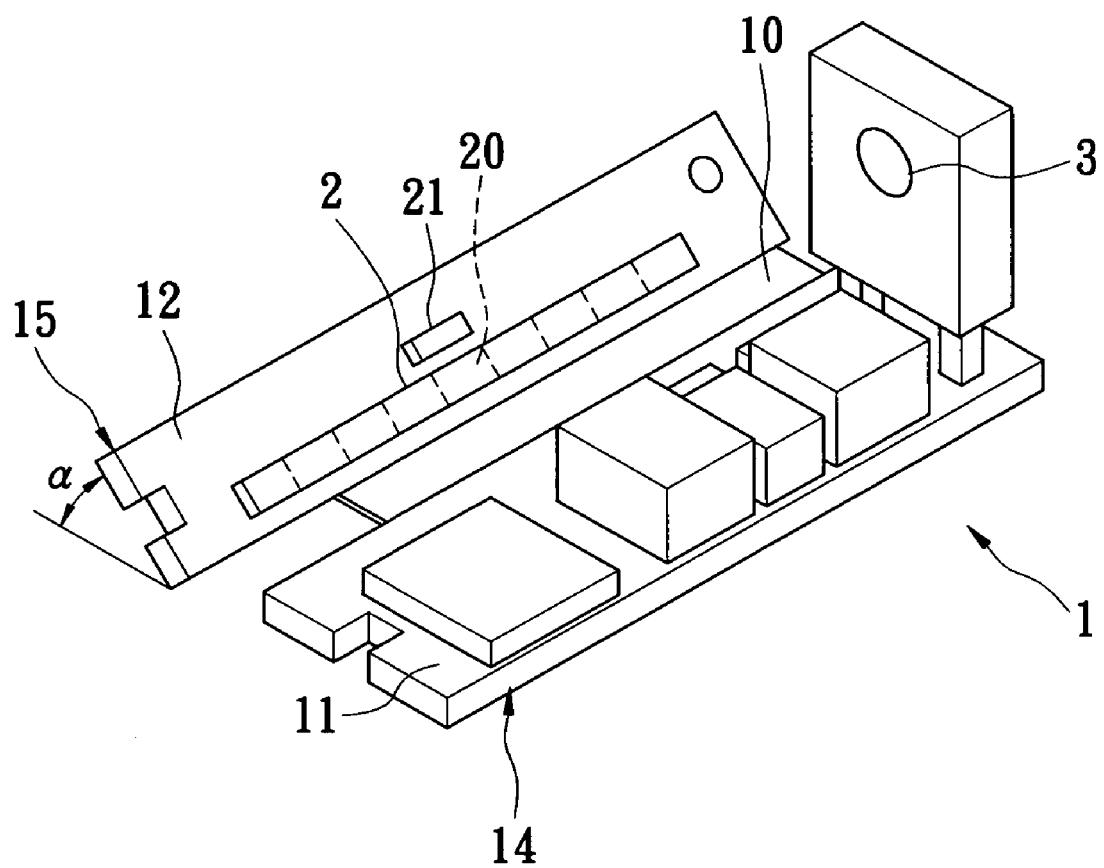
FIG. 9 is another perspective view of a composite circuit board, a linear sensor array, a motion sensor, and a light source according to the second embodiment of a contact image sensing module of a fingerprint scanning device of the present invention.
Figure 10:
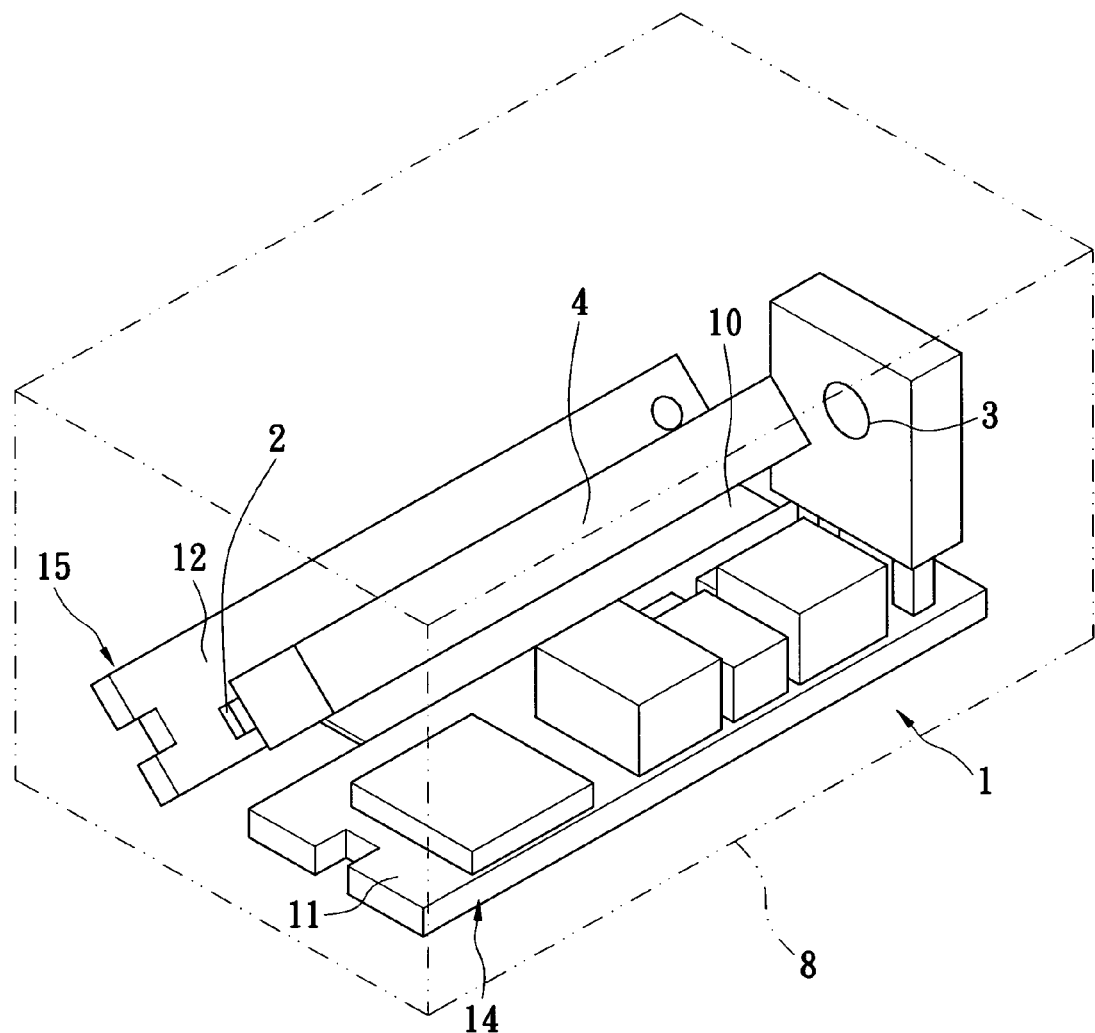
FIG. 10 is a perspective view of a composite circuit board, a linear sensor array, a motion sensor, a light source, and a focusing device according to the second embodiment of a contact image sensing module of a fingerprint scanning device of the present invention.
Figure 11:
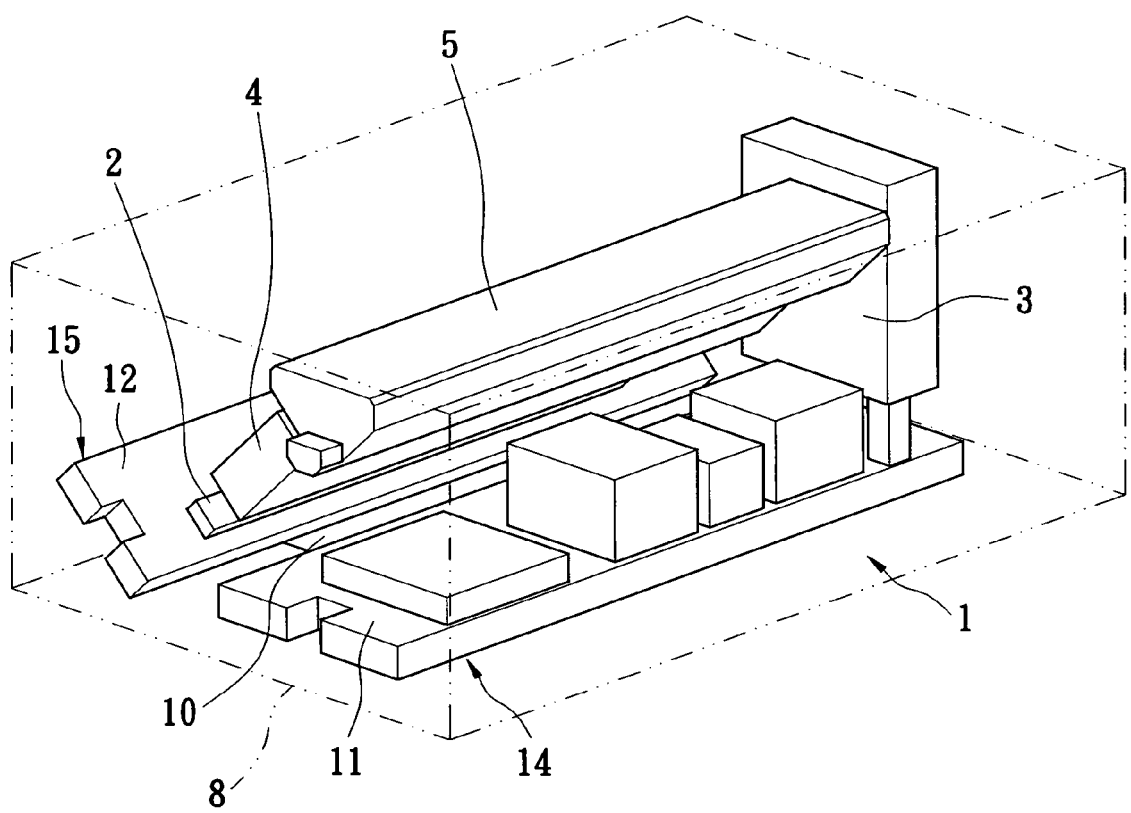
FIG. 11 is a perspective view of the second embodiment of a contact image sensing module of a fingerprint scanning device of the present invention.

The detection surface A is defined at one side of the linear sensor array 2 and the motion sensor 21. As shown in FIG. 7, the detection surface A is defined on the reflecting surface 50 for placement of a fingerprint 9 thereon.

As shown in FIG. 7, the fingerprint 9 moves on the detection surface A along a longitudinal direction of the contact image sensing module 60. That is, the fingerprint 9 moves on the reflecting surface 50 along a longitudinal direction perpendicular to the linear sensor array 2. Light of the light source 3 is projected to one end of the light guide device 5 and uniformly guided by the light guide device 5. The light is transmitted to the detection surface A and then reflected by the fingerprint 9 to the focusing device 4 through the light-emanating surface 51. The light is focused onto the linear sensor array 2 and the motion sensor 21 by the focusing device 4 and. After processing, segments of fingerprint image are integrated into a whole fingerprint image.

When the fingerprint 9 moves on the detection surface A, the motion sensor 21 and the comparison sensor 20 of the linear sensor array 2 repetitively capture a reference image data and a comparison image data in the space domain from the fingerprint 9 according to the sampling time order, respectively. A segment of the reference image data and a segment of the comparison image data are selected. After the processing of a shift times discriminant and a speed discriminant, the speeds of the fingerprint 9 relative to the motion sensor 21 and the comparison sensor 20 can be obtained. Because there is no need of the conventional complicated structure, the size of the image sensing module of the present invention can be reduced, hence reducing the space occupied by installing the image sensing module in the electronic device. Besides, through the processing of the shift times discriminant and the speed discriminant, the original fingerprint image can be protected from influences of environment, electric noise, and characteristic variation of sensor to make the measurement of the relative speed more accurate.

Because the flexible printed circuit board 10 of the composite circuit board is bendable, the linear sensor array 2 has a tilt angle. The height and longitudinal depth of the contact image sensing module 60 are thus shortened to reduce the whole volume thereof. Therefore, the contact image sensing module 60 can be easily assembled in a miniaturized electronic device. Moreover, the allowable tolerance of the optical path of the light source 3 is larger to increase the product yield. Because the motion sensor 21 is close to the linear sensor array 2 and the upward tilt angle of the first composite substrate can be adjusted, distortion of image can be avoided.

The light guide function of the light guide device 5 decreases the required number of the light source 3 of the contact image sensing module 60 and makes light of the light source 3 more uniform, hence lowering the cost and the power consumption thereof. Moreover, the processing efficiency of the contact image sensing module 60 to the captured fingerprint image is enhanced.

Because the contact image sensing module 60 requires no additional electrostatic protection device, the cost of the fingerprint scanning device 6 is lowered. The detection surface A is defined on the reflecting surface 50 of the light guide device 5. Because the linear sensor array 2 makes no direct contact with the fingerprint 9, it is not easily damaged, hence lengthening the lifetime of use of the fingerprint scanning device 6. Moreover, the fingerprint image capturing effect of the contact image sensing module 60 is not affected by the time the fingerprint 9 stays thereon, hence making the captured fingerprint image clearer.

FIGS. 8 to 11 show a second embodiment of the contact image sensing module 60 of the fingerprint scanning device 6 of the present invention. The first and second embodiments of the contact image sensing module 60 of the fingerprint scanning device 6 differ in the main circuit board 1 and the light source 3. In the second embodiment, the main circuit board 1 is a composite circuit board, which comprises a first rigid printed circuit board 11, a second rigid printed circuit board 12 and at least a flexible printed circuit board 10. The first and second rigid printed circuit boards 11 and 12 are electrically connected to the flexible printed circuit board 10 to form a first composite substrate 14 and a second composite substrate 15, respectively. The second composite substrate 15 tilts upwards a predetermine angle α relative to the first composite substrate 14. The light source 3 is electrically connected with the first rigid printed circuit board 11 of the first composite substrate 14 by means of dual-in-line package (DIP). The light source 3 of the second embodiment is directly disposed on the first composite substrate 14.

Of course, the main circuit board 1 can also be a conventional rigid printed circuit board, and the shift times discriminant and the speed discriminant are used to obtain the relative speeds.

FIG. 12 shows a first embodiment (a mobile phone) of an electronic device with a fingerprint scanning function of the present invention. The electronic device 71 with a fingerprint scanning function comprises a fingerprint scanning device 6 and a controller (e.g., a baseband control microprocessor 711).

The fingerprint scanning device 6 is illustrated in FIGS. 1 to 11. The fingerprint scanning device 6 is built in the electronic device 71. The interface controller 63 is electrically connected to the microprocessor 711 to control the transmission of the digital signal to the microprocessor 711. Of course, the electronic device 71 can also be a personal digital assistant (PDA) or another different electronic device.

Figure 13:
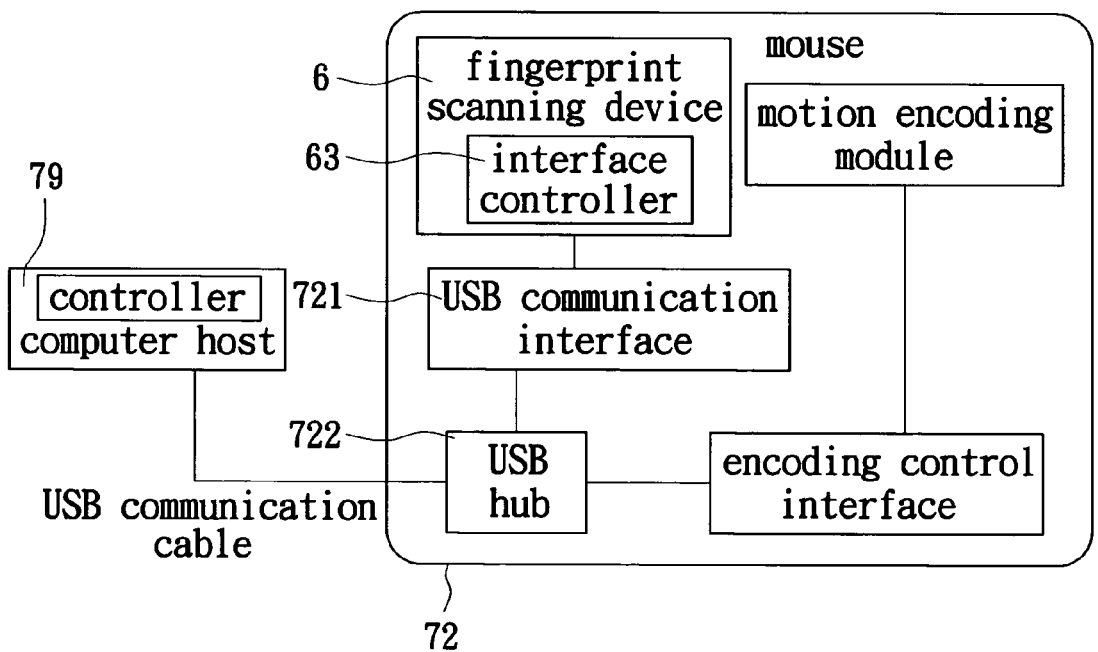
FIG. 13 is a block diagram according to a second embodiment of an electronic device with a fingerprint scanning function of the present invention.
Figure 14:
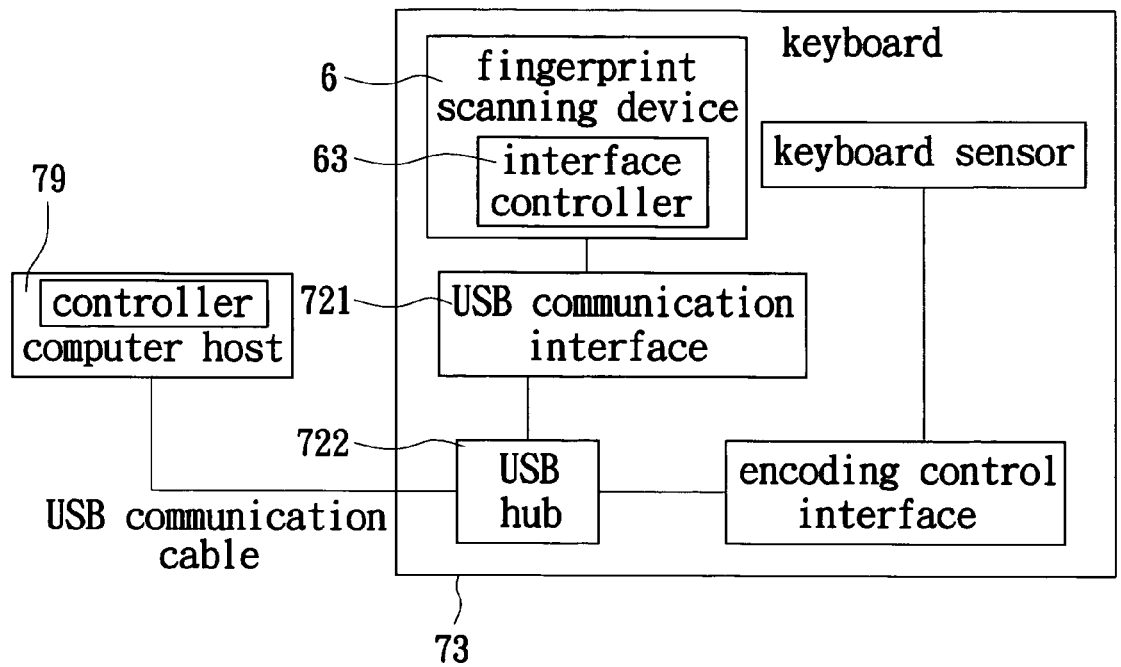
FIG. 14 is a block diagram according to a third embodiment of an electronic device with a fingerprint scanning function of the present invention.
Figure 15:
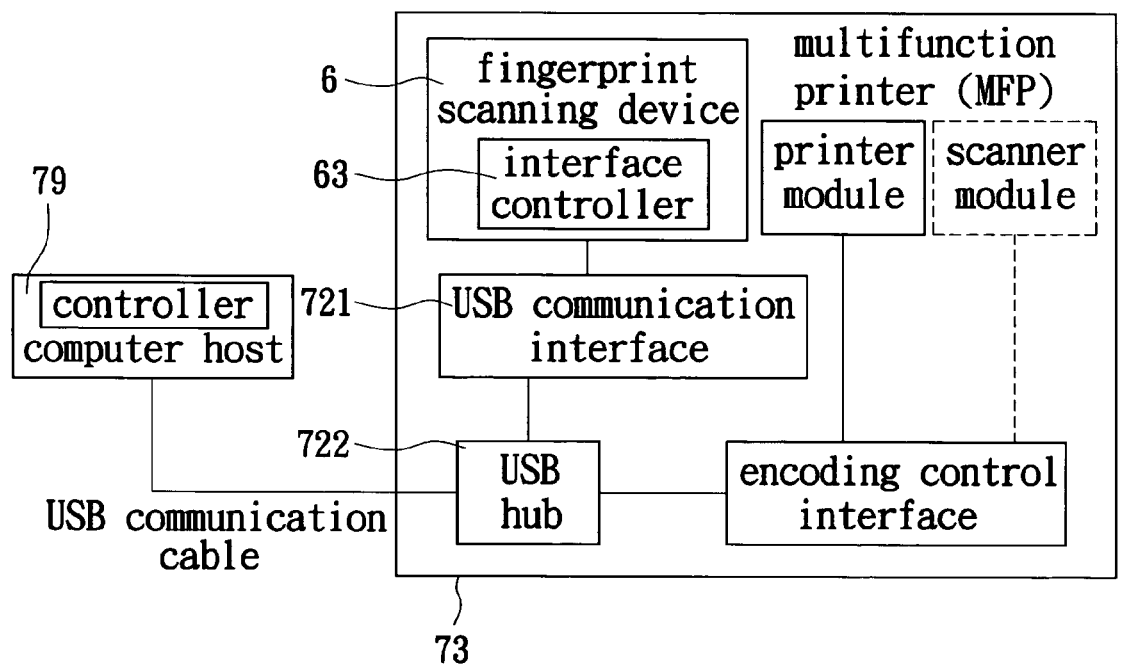
FIG. 15 is a block diagram according to a fourth embodiment of an electronic device with a fingerprint scanning function of the present invention.
Figure 16:
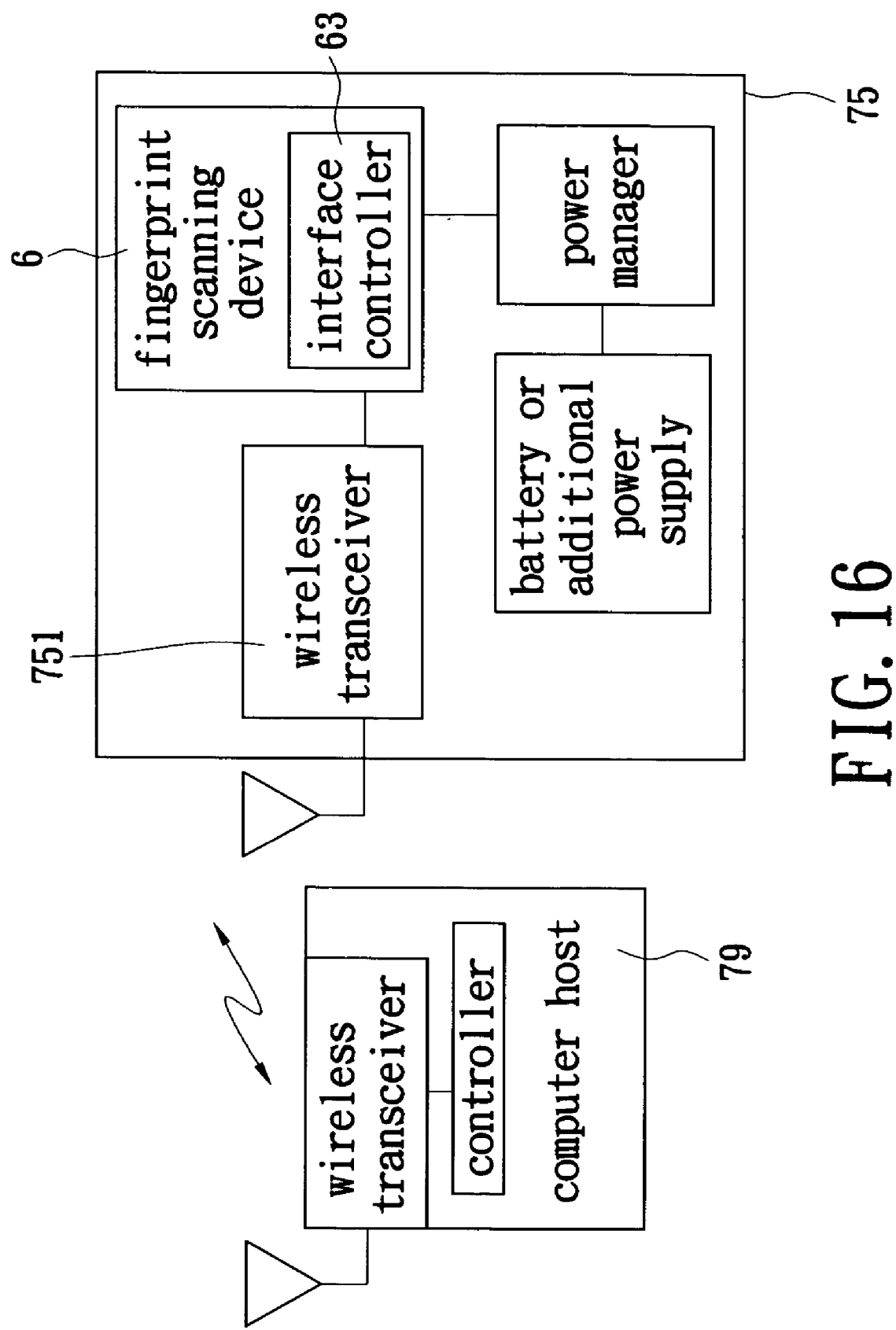
FIG. 16 is a block diagram according to a fifth embodiment of an electronic device with a fingerprint scanning function of the present invention.

FIG. 13 to 15 show a second embodiment (mouse), a third embodiment (keyboard) and a fourth embodiment (multifunction printer) of an electronic device with a fingerprint scanning function of the present invention, respectively. The electronic device 72 (or 73, 74) with a fingerprint scanning function of the present invention comprises a fingerprint scanning device 6 and a communication interface.

The fingerprint scanning device 6 is illustrated in FIGS. 1 to 11. The fingerprint scanning device 6 is built in the electronic device 72 (or 73, 74). The interface controller 63 is electrically connected to the communication interface to control the transmission of the digital signal to the communication interface. The communication interface is a wired communication interface 721 (e.g., a USB communication interface). The electronic device 72 (or 73, 74) also has a USB hub 722. The USB communication interface is electrically connected to the USB hub 722, which is connected to an external electronic device 79 (e.g., a computer host) via a USB communication cable. Of course, the electronic device 72 (or 73, 74) can also be a light pen, a USB memory storage, or a multimedia playback device. Moreover, the fingerprint scanning device 6 and the communication interface can form an independent module connected to the electronic device 72 (or 73, 74) via a communication cable.

FIG. 16 shows a fifth embodiment (a wireless fingerprint scanning device) of an electronic device with a fingerprint scanning function of the present invention. The electronic device 75 with a fingerprint scanning function comprises a fingerprint scanning device 6 and a communication interface.

The fingerprint scanning device 6 is illustrated in FIGS. 1 to 11. The fingerprint scanning device 6 is built in the electronic device 75. The interface controller 63 is electrically connected to the communication interface to control the transmission of the digital signal to the communication interface. The communication interface is a wireless communication interface 751 (e.g., a wireless transceiver). The fingerprint scanning device 6 achieves wireless transmission with an external electronic device 79 with a wireless transceiver (not shown) via the wireless communication interface 751.

The fingerprint scanning device and the electronic device with a fingerprint scanning function of the present invention have the following features:

1. The contact image sensing module needs no additional electrostatic protection device, and the linear sensor array makes no direct contact with the fingerprint, hence lowering the cost and lengthening the lifetime of use of the fingerprint scanning device.

2. The fingerprint image capturing effect of the contact image sensing module 60 is not affected by the time the fingerprint 9 stays thereon, hence making the captured fingerprint image clearer.

3. The interface controller is connected to the signal conversion controller and the module controller to provide various control functions such as accomplishing the communication protocol between the fingerprint scanning device and the electronic device, temporal storage and buffer of the digital signal, formatting of the digital signal, and transmission of the digital signal, thereby making the digital signal transmitted by the signal conversion controller more easily accessible.

4. The fingerprint scanning device can be built in an electronic device, or can match the communication interface to form an independent module.

5. The communication interface can be a wired communication interface or a wireless communication interface.

6. The motion sensor and the comparison sensor of the linear sensor array capture a segment of reference image data and a segment of comparison image data respectively. After the processing of a shift times discriminant and a speed discriminant, the speeds of the fingerprint relative to the motion sensor and the comparison sensor can be obtained. Therefore, the size of the image sensing module can be reduced to save the occupied space for installing the image sensing module in the electronic device.

7. The structure of the composite circuit board makes the linear sensor array have a tilt angle to reduce the whole volume. Therefore, the contact image sensing module can be easily assembled into a miniaturized electronic device.

8. The structure of the composite circuit board makes the linear sensor array show a tilt angle to increase the allowable tolerance of the optical path of the light source, hence enhancing the product yield.

9. The structure of the light guide device makes light of the light source transmitted to the fingerprint more uniform. Therefore, the processing efficiency of the image sensing module to the captured fingerprint image is enhanced.

10. The structure of the light guide device can reduce the required number and power consumption of the light source, hence lowering the cost and lengthening the lifetime of use of the contact image sensing module.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

What is claimed is:

1. A fingerprint scanning device comprising:
a contact image sensing module for capturing a fingerprint image, said contact image sensing module including a main circuit board, said main circuit board being a composite circuit board, said composite circuit board including a first rigid printed circuit board, a second rigid printed circuit board, a third rigid printed circuit board and at least a flexible printed circuit board, said first, second and third rigid printed circuit boards being electrically connected to said flexible printed circuit board to respectively form a first composite substrate, a second composite substrate and a third composite substrate;
a signal conversion controller electrically connected to said contact image sensing module and used to convert said analog fingerprint image to a digital signal;
a module controller electrically connected to said contact image sensing module and said signal conversion controller and used to control said contact image sensing module and said signal conversion controller; and
an interface controller electrically connected to said signal conversion controller and said module controller and used to control the transmission of said digital signal to a controller in an electronic device.

2. The fingerprint scanning device as claimed in claim 1, wherein said module controller and said interface controller are integrated into a single controller.

3. The fingerprint scanning device as claimed in claim 1, wherein said interface controller is further electrically connected with a wired communication interface and a wireless communication interface.

4. The fingerprint scanning device as claimed in claim 1, wherein said contact image sensing module further comprises:
a linear sensor array disposed on said main circuit board;

at least a motion sensor disposed on said main circuit board and parallel-arranged at one side of said linear sensor array;

a light source; and a detection surface defined at one side of said linear sensor array and said motion sensor;

whereby a fingerprint is placed on said detection surface, and light of said light source is transmitted to said detection surface and reflected by said fingerprint to said linear sensor array and said motion sensor.

5. The fingerprint scanning device as claimed in claim 4, wherein a predetermined upward tilt angle is formed on each of said second and third composite substrates facing said first composite substrate, said linear sensor array and said motion sensor are disposed on said second composite substrate, and said light source is disposed on said third composite substrate.

6. The fingerprint scanning device as claimed in claim 5, wherein said linear sensor array and said motion sensor are electrically connected to said second rigid printed circuit board by means of chip-on-board.

7. The fingerprint scanning device as claimed in claim 5, wherein said light source is electrically connected to said third rigid printed circuit board by means of chip-on-board.

8. The fingerprint scanning device as claimed in claim 4, wherein said linear sensor array has a plurality of image sensors, and at least one of said image sensors corresponds to said motion sensor and is defined as a comparison sensor.

9. The fingerprint scanning device as claimed in claim 4, wherein said contact image sensing module has a light guide device, wherein an axis said light guide device is parallel to said linear sensor array, and one end of said light guide device is adjacent to said light source.

10. The fingerprint scanning device as claimed in claim 9, wherein said contact image sensing module has a focusing device, wherein an axis of said focusing device is parallel to said linear sensor array, and said focusing device is located between said light guide device and said linear sensor array.

11. The fingerprint scanning device as claimed in claim 10, wherein a reflecting surface and a light-emanating surface are formed along an axis of said light guide device, a detection surface is defined on said reflecting surface, and said light-emanating surface corresponds to said focusing device.

12. An electronic device with a fingerprint scanning function, comprising:

a fingerprint scanning device; and a microprocessor;

wherein said fingerprint scanning device comprises:

a contact image sensing module for capturing a fingerprint image, said contact image sensing module including a main circuit board, said main circuit board being a composite circuit board, said composite circuit board including a first rigid printed circuit board, a second rigid printed circuit board, a third rigid printed circuit board and at least a flexible printed circuit board, said first, second and third rigid printed circuit boards being electrically connected to said flexible printed circuit board to respectively form a first composite substrate, a second composite substrate and a third composite substrate;

a signal conversion controller electrically connected to said contact image sensing module and used to convert said analog fingerprint image to a digital signal;

a module controller electrically connected to said contact image sensing module and said signal conversion controller and used to control said contact image sensing module and said signal conversion controller; and an interface controller electrically connected to said signal conversion controller, said module controller, and said microprocessor, and used to control the transmission of said digital signal to said microprocessor.

13. An electronic device with a fingerprint scanning function, comprising:

a fingerprint scanning device; and a communication interface;

wherein said fingerprint scanning device comprises:

a contact image sensing module for capturing a fingerprint image said contact image sensing module including a main circuit board, said main circuit board being a composite circuit board, said composite circuit board including a first rigid printed circuit board, a second rigid printed circuit board, a third rigid printed circuit board and at least a flexible printed circuit board, said first, second and third rigid printed circuit boards being electrically connected to said flexible printed circuit board to respectively form a first composite substrate, a second composite substrate and a third composite substrate;

a signal conversion controller electrically connected to said contact image sensing module and used to convert said analog fingerprint image to a digital signal;

a module controller electrically connected to said contact image sensing module and said signal conversion controller and used to control said contact image sensing module and said signal conversion controller; and an interface controller electrically connected to said signal conversion controller, said module controller and said communication interface and used to control the transmission of said digital signal to said communication interface.

14. electronic device with a fingerprint scanning function as claimed in claim 13, wherein said communication interface is a wired communication interface.

15. The electronic device with a fingerprint scanning function as claimed in claim 14, further comprising a USB hub, wherein said communication interface is a USB communication interface and is connected to said USB hub.

16. The electronic device with a fingerprint scanning function as claimed in claim 13, wherein said communication interface is a wireless communication interface.

17. A fingerprint scanning device comprising:

a contact image sensing module for capturing a fingerprint image, wherein said contact image sensing module includes a main circuit board, said main circuit board is a composite circuit board, said composite circuit board comprising a first rigid printed circuit board, a second rigid printed circuit board, and a flexible printed circuit board, said first and second rigid printed circuit boards being electrically connected to said flexible printed circuit board to form a first composite substrate and a second composite substrate, respectively;

a signal conversion controller electrically connected to said contact image sensing module and used to convert said analog fingerprint image to a digital signal;

a module controller electrically connected to said contact image sensing module and said signal conversion controller and used to control said contact image sensing module and said signal conversion controller; and an interface controller electrically connected to said signal conversion controller and said module controller and used to control the transmission of said digital signal to a contoller in an electronic device.

18. The fingerprint scanning device as claimed in claim 17, wherein said contact image sensing module further comprises:
- a linear sensor array disposed on said main circuit board,
- at least a motion sensor disposed on said main circuit board and parallel-arranged at one side of said linear sensor array;
- a light source; and
- a detection surface defined at one side of said linear sensor array and said motion sensor;
- whereby a fingerprint is placed on said detection surface, and light of said light source is transmitted to said detection surface and reflected by said fingerprint to said linear sensor array and said motion sensor.

19. The fingerprint scanning device as claimed in claim 18, wherein a predetermined upward tilt angle is formed on each of said second composite substrate facing said first composite substrate, said linear sensor array and said motion sensor are disposed on said second composite substrate, and said light source is disposed on said first composite substrate.

20. The fingerprint scanning device as claimed in claim 19, wherein said linear sensor array and said motion sensor are electrically connected to said second rigid printed circuit board by means of chip-on-board.

21. The fingerprint scanning device as claimed in claim 19, wherein said light source is electrically connected to said first rigid printed circuit board by means of dual-in-line package.

* * * * *